United States Patent [19]

Kinsey, III et al.

[11] Patent Number: 5,565,513
[45] Date of Patent: Oct. 15, 1996

[54] METHOD AND COMPOSITION FOR DELAYING THE CROSS-LINKING OF WATER SOLUBLE POLYMER SOLUTIONS

[75] Inventors: E. Wayne Kinsey, III, Odessa; Sharif Sharif; David N. Harry, both of Midland, all of Tex.

[73] Assignee: Benchmark Research & Technology, Inc.

[21] Appl. No.: 495,180

[22] Filed: Jun. 27, 1995

Related U.S. Application Data

[62] Division of Ser. No. 213,868, Mar. 16, 1994.

[51] Int. Cl.$^6$ ............................ C08J 5/10; C08K 3/38; C08L 25/04
[52] U.S. Cl. ............................ 524/405; 523/130; 524/55; 524/404; 252/315.1; 166/308; 166/295; 507/922; 507/118; 507/125; 507/221; 507/231
[58] Field of Search ............................ 523/130; 524/55, 524/404, 405; 252/8.551; 166/308, 295; 507/211, 217, 231, 221, 922, 923

[56] References Cited

U.S. PATENT DOCUMENTS 4,619,776  10/1986  Mondshine ............................ 252/8.551
5,082,579  1/1992  Dawson ............................ 252/8.551

Primary Examiner—Paul R. Michl
Assistant Examiner—U. K. Rajguru
Attorney, Agent, or Firm—Donald R. Comuzzi; Christopher L. Makay

[57] ABSTRACT

A stable, non-aqueous liquid suspension of delayed boron cross-linkers comprises an anhydrous boron compound or a sparingly soluble borate suspended in a mixture of mineral spirits (commonly termed as naphtha) and a resin. Anhydrous boron compounds suitable for suspension include, but are not limited to, anhydrous borax, anhydrous boric acid, or a mixture of both the anhydrous borax and anhydrous boric acid. Sparingly soluble borates suitable for suspension include, but are not limited to, alkaline earth metal borates, alkali metal borates, or a mixture thereof. The mixture between the mineral spirits and resin produces a mineral spirits-resin solution. Alternatively, the mineral spirits may be replaced with a suitable oil which forms an oil-resin solution when mixed with the resin. The oil-resin solution suspends the anhydrous boron compound or the sparingly soluble borate to produce a stable, non-aqueous liquid suspension of delayed boron cross-linkers.

18 Claims, No Drawings

METHOD AND COMPOSITION FOR DELAYING THE CROSS-LINKING OF WATER SOLUBLE POLYMER SOLUTIONS

CROSS-REFERENCE TO RELATED APPLICATION

This application is a divisional application of co-pending application Ser. No. 08/213,868 filed on Mar. 16, 1994.

BACKGROUND OF THE INVENTION

1. Field of the Invention

The present invention relates to compositions for controlling the gelation rates of water soluble polymer solutions used as fracturing fluids in well fracturing operations and, more particularly but not by way of limitation, to suspensions of anhydrous boron compounds in a mixture of mineral spirits (commonly termed as naphtha) and a resin or a mixture of an oil and a resin. The suspension provides a stable, non-aqueous, pumpable, liquid source of borate ions suitable for use as a gelling agent for water soluble polymer solutions.

2. Description of the Related Art

To perform a hydraulic fracturing operation, a proppant-laden water soluble polymer hydraulic fracturing fluid such as guar, hydroxypropyl guar (HPG), carboxymethyl guar (CMG), or carboxymethyl hydroxypropyl guar (CMHPG) may be injected under high pressure into a formation through a well bore. Once the natural confining pressures of the formation rock are exceeded, the fracturing fluid initiates a fracture in the formation rock that generally continues to grow during pumping. Hydraulic fracturing of the formation typically requires the fracturing fluid to reach its maximum viscosity as it enters the fracture. Increased viscosity of the fracturing fluid, which improves its ability to fracture the formation rock, usually occurs through the gelling of the water soluble polymer solution utilized as the hydraulic fracturing fluid. Gelation of water soluble polymer solutions may be achieved by the addition of aluminum, boron, titanium, or zirconium ions, or mixtures thereof to the solution.

However, if the fracturing fluid gels within the well bore, it encounters a high shear due to the limited cross-sectional area within the well bore. High shear experienced in the well bore may cause extensive and irreparable degradation in the cross-linked fracturing fluid. Furthermore, high viscosities in the fracturing fluid produce excessive back or friction pressures within the well bore and formation, thereby limiting the pumping rate and possibly the success of the hydraulic fracturing operation. Various borate ion cross-linking systems have been developed which delay the gelation of the fracturing fluid during its pumping through the well bore.

One such borate ion cross-linking system is disclosed in U.S. Pat. No. 4,619,776 issued on Oct. 28, 1986, to Mondshine. Mondshine discloses a suspension of alkaline earth metal borates, alkali metal borates, or mixtures thereof. The boron minerals are typically suspended in diesel oil and are sparingly soluble in the water soluble polymer solutions. After the introduction of the Mondshine borate suspension into a water soluble polymer solution, the suspension slowly thins and dissipates to release borate ions to gradually cross-link the polymer solution. That is, the slow solubility of the suspended, sparingly soluble borate minerals creates a cross-linking system that delays the transformation of polymer solutions into gelled, highly viscous fracturing fluids.

Although the borate ion cross-linking system disclosed by Mondshine will delay the gelation of water soluble polymer solutions, it suffers from numerous disadvantages. First, the suspension of the borate mineral in diesel oil creates a potential environmental hazard. Toxic aromatics and benzene derivatives contained in the diesel oil might contaminate marine environments or ground water sources that maybe proximate to the diesel borate suspensions at well sites. Second, the utilization of borate minerals decreases the effectiveness of the suspension. Impurities in the boron minerals reduce the quantity of boron in the suspension which produces corresponding lower levels of borate ions upon the dispersion of the suspension in a water soluble polymer solution. Third, the impurities in the borate minerals introduce variability in the delay time. The exact solubility of the borate minerals are not determinable with a high degree of accuracy and vary widely depending upon the conditions of use. Fourth, the borate mineral suspensions are usable only in cases where the bottom hole temperature of the formation is higher than about 150° F. That limitation occurs due to the very low solubility of the borate minerals and the excessive thermal delay in their cross-linking action. Finally, and perhaps most importantly, the borate mineral suspensions disclosed in Mondshine are highly unstable in suspension. That is, the suspension of the borate minerals in diesel oil may not be stored for any length of time and is highly susceptible to settling. It has been observed that the borate minerals, even after even a short length of time in storage settle to the bottom of the container in which they are stored and agglomerate into a solid. When the borate minerals cake to form a solid, the suspension becomes unusable. Even considerable shaking will not cause the borate minerals to become re-suspended. This tendency to settle may result in considerable loss of usable material.

An alternative borate ion cross-linking system is disclosed in U.S. Pat. Nos. 5,082,579; 5,145,590; and 5,160,643 issued on Jan. 21, 1992; Sep.8, 1992; and Nov. 3, 1992, respectively, to Dawson. These patents disclose a borate ion based aqueous complexor solution that delays the gelation of water soluble polymer solutions. The aqueous complexor solution consists of a cross-linking additive that provides borate ions and a delay additive in solution that serves to chemically bond with the borate ions to reduce the availability of boron to the hydrated polymer solution.

Although the Dawson borate ion cross-linking system provides improvements to some of the deficiencies characteristic of Mondshine's teaching, such as lack of control over the gelation rate, Dawson's system still suffers from a number of disadvantages. The amount of available borate ions in solution may be insufficient to cross-link all of the polymer in solution due to the presence of the delay additive. The dilution of borate ions caused by the presence of the delay additive creates a demand for considerably higher quantities of borate ions than required in a stoichiometrically balanced system. The requirement for additional boron in excess of that necessary for a stoichiometrically balanced system increases the cost of the Dawson borate ion cross-linking system. A further economic disadvantage of the Dawson system is caused by the undesirable necessity of using large quantities of carbonate buffers, such as potassium carbonate, to obtain effective delay and temperature stability of the fracturing fluid. Furthermore, due to the presence of the delay additive in solution with the borate ions, the cross-linking action of the complexor solution is thermally delayed. That thermal delay restricts use of the Dawson system to formations having bottom hole temperatures higher than 125° F. Finally, and perhaps most importantly, during storage, the borate ions in Dawson's complexor solution precipitate rendering the complexor solution deficient in boron.

Accordingly, any borate ion cross-linking system that is stable during storage, especially under severe weather conditions, yields 100% of its available boron to soluble borate ions, provides a large operational temperature range, and a wide range of cross-link delay times while retaining precise control of the specific delay is highly desirable.

SUMMARY OF THE INVENTION

In accordance with the present invention, a stable, non-aqueous liquid suspension of delayed boron cross-linkers comprises an anhydrous boron compound suspended in a mixture of mineral spirits (commonly termed naphtha) and a resin. Anhydrous boron compounds suitable for suspension include, but are not limited to, anhydrous borax, anhydrous boric acid, or a mixture of both the anhydrous borax and anhydrous boric acid. The mixture between the mineral spirits and the resin produces a mineral spirits-resin solution. Alternatively, the mineral spirits may be replaced with a suitable oil to form an oil-resin solution utilized to suspend the anhydrous boron compound.

The suspension of delayed boron cross-linkers may be prepared by slurrying an anhydrous boron compound with mineral spirits or oil, followed by the gradual addition of the resin. After the gradual addition of the resin, the resulting product is mixed until the anhydrous boron compound is completely and uniformly suspended within the mineral spirits-resin solution or the oil-resin solution.

Similarly, the suspension of delayed boron cross-linkers may be prepared by slurring anhydrous boron compound with the resin followed by the gradual addition of the mineral spirits or oil. After the gradual addition of the mineral spirits or oil, the resulting product is mixed until the anhydrous boron compound is completely and uniformly suspended within the mineral spirits-resin solution or oil-resin solution.

Alternatively, mineral spirits or oil and the resin may be mixed to form the mineral spirits-resin solution or the oil-resin solution followed by the gradual addition of an anhydrous boron compound. After the addition of the anhydrous boron compound, the resulting product is mixed until the anhydrous boron compound is completely and uniformly suspended within the mineral spirits-resin solution or oil-resin solution.

The suspension of delayed boron cross-linkers exhibits many advantages over currently available delayed borate ion cross-linking systems. First, 100% of the boron present in the suspended anhydrous boron compound converts to soluble borate ions because the suspended anhydrous boron compounds are completely water soluble. That is, the anhydrous boron compound contains available $B_2O_3$ which completely dissolves in the water soluble polymer solution to release borate ions which then cross-link the water soluble polymer solution. Second, the suspension of delayed boron cross-linkers operate to cross-link water soluble polymer solutions in an improved temperature range of from about 80° F. to about 325° F. due to the complete availability of the boron in the anhydrous boron compound and the absence of chelates (i.e., complexing agents) as in Dawson or the crystal lattice bonding of boron as in Mondshine. Third, the suspension of delayed boron cross-linkers are stable on aging, even under severe winter conditions, due to their non-aqueous composition and relatively high viscosity compared to current borate suspensions such as Mondshine's.

Finally, the anhydrous nature of the suspended boron compound furnishes a wide range of delay times (from 30 seconds to 10 minutes) while still providing a great degree of precision over those delay times. Cross-link times are controlled by varying any one of or all of the following:

1) the anhydrous boron compound used (e.g., anhydrous borax, anhydrous boric acid, or a mixture of both the anhydrous borax and anhydrous boric acid),
2) the particle size of the anhydrous boron compound in suspension,
3) the pH of the fracturing fluid prior to the addition of the suspension,
4) the concentration (i.e., loading) of the suspension in the fracturing fluid,
5) the $B_2O_3$ content in the suspension, and
6) the temperature of the fracturing fluid.

Although anhydrous boron compounds produce the most effective suspended delayed borate cross-linkers due to their complete solubility in water soluble polymer solutions, sparingly soluble borates may also be utilized. Sparingly soluble borates suitable for use in the suspension include, but are not limited to, alkaline earth metal borates, alkali metal borates, and mixtures thereof. Suspensions of the sparingly soluble borates produced using any one of the above-described methods exhibit the advantages of the anhydrous boron compound suspensions, except the sparingly soluble borates yield fewer borate ions per unit weight of suspended boron compound due to their sparingly soluble nature.

It is, therefore, an object of the present invention to provide a suspension that is stable on aging, even under severe weather conditions.

It is another object of the present invention to provide a suspension that is safer for the environment and costs less than current suspensions.

It is a further object of the present invention to provide a suspension that includes anhydrous boron compounds that yield 100% of total boron to available soluble borate ions.

It is still another object of the present invention to provide a suspension that may include up to about 50% boron as $B_2O_3$.

It is still a further object of the present invention to provide a suspension that operates in a temperature range of from about 80° F. to about 325° F.

It is even another object of the present invention to provide a suspension that furnishes a wide range of cross-linking delay times while still allowing precise control over those times.

It is an even further object of the present invention to provide a suspension of sparingly soluble borates.

Still other objects, features and advantages of the present invention will become evident to those skilled in the art in light of the following.

DETAILED DESCRIPTION OF THE PREFERRED EMBODIMENT

A stable, non-aqueous liquid suspension of delayed boron cross-linkers comprises an anhydrous boron compound suspended in a mixture of mineral spirits (commonly termed as naphtha) and a resin. Anhydrous boron compounds suitable for suspension include, but are not limited to, anhydrous borax, anhydrous boric acid, or a mixture of both the anhydrous borax and anhydrous boric acid The mixture between the mineral spirits and resin produces a mineral spirits-resin solution. The anhydrous borax suitable for suspension in the mineral spirits soluble resin comprises 69.2% boron as $B_2O_3$ and 30.2% sodium as $Na_2 O$. The anhydrous boric acid suitable for suspension in the mineral spirits-soluble resin comprises 100% boron as $B_2O_3$. The chemical formulas for the anhydrous borax and the anhydrous boric acid are expressed as $Na_2B_4O_7$ and $B_2O_3$, respectively.

The resins suitable for mixture with the mineral spirits to create the mineral spirits-resin solution utilized in the suspension include, but are not limited to, styrene/isoprene copolymer, styrene ethylene propylene block polymer, styrene isobutylene copolymer, styrene butadiene copolymer, polybutylene, polystyrene, polyethylene-propylene copolymer, and like compounds. The preferred resins are block copolymers which include, but are not limited to, styrene ethylene/propylene block polymer, hydrogenated styrene block polymers, and styrene butadiene copolymers. The most preferred block copolymers are hydrogenated styrene/isoprene block polymers which are sold under the trademark "BARARESIN VIS" by Baroid Corporation and under the trademark "SHELLVIS 40" and SHELLVIS 50"by Shell Chemical Company".

The suspension may be prepared by slurrying an anhydrous boron compound with mineral spirits followed by the gradual addition of the resin. After the gradual addition of the resin, the resulting product is mixed until the anhydrous boron compound is completely and uniformly suspended within the mineral spirits-resin solution.

Similarly, the suspension may be prepared by slurrying the anhydrous boron compound with the resin followed by the gradual addition of the mineral spirits. After the gradual addition of the mineral spirits, the resulting product is mixed until the anhydrous boron compound is completely and uniformly suspended within the mineral spirits-resin solution.

Alternatively, mineral spirits and the resin may be mixed to form the mineral spirits-resin solution followed by the gradual addition of the anhydrous boron compound. After the addition of the anhydrous boron compound, the resulting product is mixed until the anhydrous boron compound is completely and uniformly suspended within the mineral spirits-resin solution.

Using any one of the above-described methods, the suspension is prepared by supplying the mineral spirits in a range of from about 20% to about 40% by weight, the resin in a range of from about 20% to about 60% by weight, and the anhydrous boron compound in a range of up to and including 50% by weight.

In an alternative embodiment of the stable, non-aqueous liquid suspension of delayed boron cross-linkers, the mineral spirits may be replaced with a suitable oil such as any hydrocarbon oil which includes, but is not limited to, vegetable oils, crude oil, kerosene, pentane, decane, soybean oil, corn oil, and the like. When an oil is substituted for the mineral spirits, the oil and resin mix to form an oil-resin solution which suspends the anhydrous boron compound. Additionally, the above-described methods remain the same as well as the proportions of the oil, resin, and anhydrous boron compound (i.e., from about 20% to about 40% by weight oil, from about 20% to about 60% by weight resin, and up to and including 50% by weight anhydrous boron compound).

EXAMPLE NON-AQUEOUS LIQUID
SUSPENSIONS OF DELAYED BORON
CROSS-LINKERS AND CORRESPONDING
METHODS OF PREPARATION

EXAMPLE I

A suspension may be prepared by mixing mineral spirits in an amount of 25% total weight with styrene/isoprene copolymer in an amount of 25% total weight for five minutes utilizing an overhead stirrer. At the expiration of the five minutes, anhydrous borax, having a particle size of smaller than 20 mesh, is gradually added in an amount of 50% total weight. After the anhydrous borax has been added, the resulting product is mixed for 15 minutes utilizing the overhead stirrer. The suspension resulting from the above-method contains boron as $B_2O_3$ in an amount of 33.4% by weight.

EXAMPLE II

A suspension may be prepared by slurrying anhydrous borax in an amount of 33.3% total weight with mineral spirits in an amount of 36.8% total weight for five minutes utilizing an overhead stirrer. The anhydrous borax in this example has a particle size of smaller than 60 mesh. At the expiration of the five minutes, styrene/isoprene copolymer in an amount of 29.9% total weight is gradually added. After the styrene/isoprene copolymer has been added, the resulting product mixed for 15 minutes utilizing an overhead stirrer. The suspension resulting from the above method contains boron as $B_2O_3$, in an amount of 22.2% by weight.

EXAMPLE III

A suspension may be prepared by mixing mineral spirits in an amount of 33.33% total weight with styrene/isoprene copolymer in an amount of 33.33% total weight for five minutes utilizing an overhead stirrer. At the expiration of the five minutes, anhydrous boric acid having a particle of size smaller 60 mesh is gradually added in an amount of 33.33% total weight. After the anhydrous boric acid has been added, the resulting product is mixed for 15 minutes utilizing an overhead stirrer. The suspension resulting from the above-method contains boron as $B_2O_3$ in an amount of 33.33% by weight.

The suspensions produced using the mineral spirits or oil, resin, and anhydrous boron compound employing the above-described methods provide a stable, pumpable, liquid source of borate ions suitable as cross-linking agents for water soluble polymer solutions utilized in well-fracturing operations. To perform a hydraulic fracturing operation utilizing the suspension, a water soluble polymer solution such as guar, hydroxypropyl guar (HPG), carboxymethyl guar (CMG), or carboxymethyl hydroxypropyl guar (CMHPG) is prepared using any of several well known methods such as that disclosed in U.S. Pat. No. 5,160,643. The pH of the water soluble polymer solution is adjusted to between about 8.5 and about 12.5, using any of several well known methods such a that disclosed in U.S. Pat. No. 5,160,643. Once the pH of the solution has been properly adjusted, the suspended delayed borate cross-linking suspension is combined with the water soluble polymer solution, and the resulting mixture pumped into the formation. As is typical in hydraulic fracturing operations, proppants designed to maintain a highly conductive fracture are usually incorporated into the fracturing fluid.

Upon contact with the water soluble polymer solution, the cross-linking suspension generates borate ions. More particularly, the anhydrous borax, anhydrous boric acid, or the mixture of both, suspended in the mineral spirits-soluble resin are released from suspension and dissolve into the water soluble polymer solution, thereby releasing borate ions into the water soluble polymer solution. As the borate ions enter the water soluble polymer solution, they act as bonding agents (cross-links) between the molecules of the water soluble polymer solution. The fracturing fluid resulting from the cross-linked water soluble polymer solution is extremely viscous and transports proppants uniformly into the hydraulically induced fracture in the formation rock. The reaction which produces the cross-linked water soluble polymer fracturing fluid may be illustrated as follows:

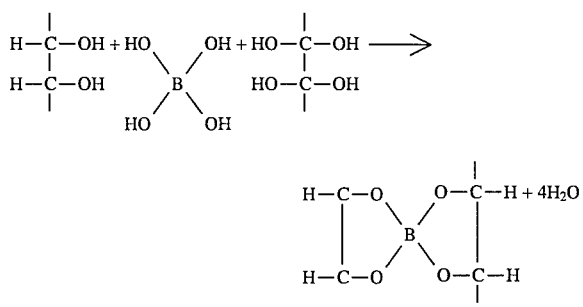

The suspension exhibits many advantages over currently available delayed borate ion cross-linking systems. First, 100% of the total boron in the suspended anhydrous boron compound converts into soluble borate ions because the anhydrous boron compounds are completely water soluble and because the pH of the hydrated polymer solution is between about 8.5 and about 12.5. That is, the anhydrous borax and boric acid each comprise pure $B_2O_3$ which completely dissolves in the alkaline water soluble polymer solution to release borate ions which then cross-link the water soluble polymer solution. Second, the suspensions operate to cross-link water soluble polymer solutions in an improved temperature range of from about 80° F. to about 325° F. due to the complete availability of boron in the anhydrous boron compound and the absence of chelates (i.e., complexing agents). Third, the suspensions are stable on aging, even under severe weather conditions, due to their non-aqueous composition and relatively high viscosities.

Finally, the anhydrous nature of the suspended borax, boric acid, or mixture of both, furnishes a wide range of delay times (from 30 seconds to 10 minutes) while still providing a great degree of precision over those delay times. Cross-link times are controlled by varying any one of or all of the following:

1) the anhydrous boron compound used,
2) the particle size of the anhydrous boron compound in suspension,
3) the pH of the fracturing fluid prior to the addition of the suspension,
4) the concentration (i.e., loading) of the suspension in the fracturing fluid,
5) the $B_2O_3$ content in the suspension, and
6) the temperature of the fracturing fluid.

Illustratively, When used under similar conditions, the type of boron compound (i.e., anhydrous borax, anhydrous borax acid, or a mixture of both) may be employed effectively to control the exact cross-linking time of a water soluble solution. More particularly, suspensions of anhydrous borax cross-link a water soluble polymer solution more slowly than suspensions of anhydrous boric acid. Accordingly, suspensions of mixtures of both anhydrous borax and anhydrous boric acid cross-link water soluble polymer solutions over a range of times between the extreme cross-link ranges produced by suspensions solely of either anhydrous borax or anhydrous boric acid.

With respect to the particle size of the suspended anhydrous borax, anhydrous boric acid, or mixture of both, as particle size increases, the time required for the suspension of delayed boron cross-linkers to cross-link a water soluble polymer solution increases. Conversely, as the particle size decreases, the time required for the suspension of delayed boron cross-linkers to cross-link a water soluble polymer solution decreases. Particle sizes of the anhydrous borax, anhydrous boric acid, or mixture of both suitable for suspension in the mineral spirits-soluble resin, range from about 20 mesh to about 325 mesh.

The pH of the water soluble polymer solution prior to its cross-linking by the suspension of delayed boron cross-linkers is utilized to control cross-link times. The pH of the water soluble polymer solution affects the solubility rate of the suspension. Specifically, as the pH of the water soluble polymer solution increases, the solubility rate increases if the suspension contains a majority of anhydrous boric acid particles, whereas the solubility rate decreases if the suspension contains a majority of anhydrous borax particles. Conversely, as the pH of the water soluble polymer solution decreases, the solubility rate decreases if the suspension contains a majority of anhydrous boric acid particles, whereas the solubility rate increases if the suspension contains a majority of anhydrous borax particles.

Both the concentration (i.e., loading) of the suspension of the delayed boron cross-linkers in the water soluble polymer solution and the content of the $B_2O_3$ in the suspension of delayed boron cross-linkers both affect cross-link time of the water soluble polymer solution similarly. That is, as both the concentration of the suspension of delayed boron cross-linkers in the water soluble polymer solution and the content of the $B_2O_3$ in the suspension increase, the cross-link time of the water soluble polymer solution decreases. Conversely, as both the concentration of the suspension of the delayed boron cross-linkers in the water soluble polymer solution and the content of the $B_2O_3$ in the suspension decrease, the cross-link time of the water soluble polymer solution increases.

Temperature may be used to alter the cross-link time of a water soluble polymer solution. As the temperature of the water soluble polymer solution increases, its cross-link time decreases. Conversely, as the temperature of the water soluble polymer solution decreases, its cross-link time increases.

TABLE I

| | Base gel: 40 ppt guar 1 liter tap $H_2O$ pH = 12.0 | |
|---|---|---|
| Loading of boron suspension in water soluble polymer solution | Suspension of Example I Total Cross-Linking Time | Suspension of Example II Total Cross-Linking Time |
| 0.5 gpt | >5 min. | >5 min. |
| 1.0 gpt | >5 min. | >5 min. |
| 1.5 gpt | >5 min. | 1 min. 10 sec. |
| 2.0 gpt | >5 min. | 30 sec. |

Table 1 lists the total cross-linking times of a water soluble polymer solution cross-linked under variable loading conditions (0.5–2.0 gpt—gallons of suspension/thousand gallons of water soluble polymer solution) utilizing the suspensions described above in Examples I and II. The water soluble polymer used was a 40 ppt (pounds of polymer/thousand gallons of water) guar having a pH of 12.0. As listed, the suspensions of delayed boron cross-linkers tested produce variations in cross-link times of from greater than 5 minutes to highly reproducible times Of from 1 minute and 10 seconds to 30 seconds depending upon the loading of the suspension of delayed boron cross-linkers.

Although anhydrous boron compounds produce the most effective suspended delayed borate cross-linkers due to their complete solubility in water soluble polymer solutions, sparingly soluble borates may also be suspended in the mineral spirits-resin solution or the oil-resin solution. Sparingly soluble borates suitable for use in the suspension include, but are not limited to, alkaline earth metal borates, alkali metal borates, or mixtures thereof. Suspensions of the sparingly soluble borates exhibit the advantages of the anhydrous boron compound suspensions, except the sparingly soluble borates yield fewer borate ions per unit weight of suspended boron compounds in water soluble polymer solutions due to their sparingly soluble nature.

Suspensions of the sparingly soluble borates may be prepared using any one of the above-described methods. Furthermore, the quantities of the mineral spirits or oil, resin, and the sparingly soluble borates remain the same as for the suspensions of anhydrous boron compounds. Specifically, using any one of the above-described methods, the suspension is prepared by supplying the mineral spirits in a range of from about 20% to about 40% by weight, the resin in a range of from about 20% to about 60% by weight, and the sparingly soluble borates in a range of up to and including 50% by weight.

EXAMPLE SPARINGLY SOLUBLE BORATE SUSPENSIONS

EXAMPLE I

A suspension may be prepared by mixing mineral spirits in an amount of 33.33% total weight with styrene/isoprene copolymer in an amount of 33.33% total weight for five minutes utilizing an overhead stirrer. At the expiration of the five minutes, is gradually added in an amount of 33.33% total weight. After the ulexite has been added, the resulting product is mixed for 15 minutes utilizing an overhead stirrer.

EXAMPLE II

A suspension may be prepared by mixing mineral spirits in an amount of 33.33% total weight with styrene/isoprene copolymer in an amount of 33.33% total weight for five minutes utilizing an overhead stirrer. At the expiration of the five minutes, colemanite is gradually added in an amount of 33.33% total weight. After the colemanite has been added, the resulting product is mixed for 15 minutes utilizing an overhead stirrer.

Although the present invention has been described in terms of the foregoing embodiment, such description has been for exemplary purposes only and, as will be apparent to those of ordinary skill in the art, many alternatives, equivalents, and variations of varying degree will fall within the scope of the present invention. That scope, accordingly, is not to be limited in any respect by the foregoing description, rather, it is defined only by the claims which follow.

We claim:

1. A composition for delaying the cross-linking of water soluble polymer solutions, comprising an anhydrous boron compound or a sparingly soluble borate suspended in a solution selected from the group consisting of a mineral spirits-resin solution and an oil-resin solution.

2. The composition according to claim 1 wherein said anhydrous boron compound is selected from the group consisting of anhydrous borax, anhydrous boric acid, and mixtures thereof.

3. The composition according to claim 1 wherein said sparingly soluble borate is selected from the group consisting of alkaline earth metal borates, alkali metal borates, and mixtures thereof.

4. The composition according to claim 1 wherein said mineral spirits-resin solution comprises mineral spirits mixed with a resin.

5. The composition according to claim 1 wherein said oil-resin solution comprises an oil mixed with a resin.

6. The composition according to claim 4 or 5 wherein said resin is selected from the group consisting of styrene/isoprene copolymer, styrene ethylene propylene block polymer, styrene isobutylene copolymer, styrene butadiene copolymer, polybutylene, polystyrene, polyethylene-propylene copolymer.

7. The composition according to claim 4 or 5 wherein said resin is a block copolymer.

8. The composition according to claim 7 wherein said block copolymer is selected from the group consisting of a styrene ethylene/propylene block polymer, a hydrogenated styrene block polymer, and a styrene butadiene copolymer.

9. The composition according to claim 7 wherein said block copolymer is a hydrogenated styrene/isoprene block polymer.

10. The composition according to claim 5 wherein said oil is selected from the group consisting of vegetable oils, crude oil, kerosene, pentane, decane, soybean oil, and corn oil.

11. A process of manufacturing a suspension which delays the cross-linking of water soluble polymer solutions, comprising the steps of:
   mixing a resin with minerals spirits to form a mineral spirits-resin solution;
   adding an anhydrous boron compound or a sparingly soluble borate;
   mixing the anhydrous boron compound or the sparingly soluble borate and the mineral spirits-resin solution until the anhydrous boron compound or sparingly soluble borate is suspended within the minerals spirits-resin solution.

12. The process according to claim 11 wherein the resin comprises from about 20% to about 60% total suspension weight.

13. The process according to claim 11 wherein minerals spirits comprises from about 20% to about 40% total suspension weight.

14. The process according to claim 11 wherein the anhydrous boron compound or the sparingly soluble borate comprises up to and including 50% total suspension weight.

15. A process of manufacturing a suspension which delays the cross-linking of water soluble polymer solutions, comprising the steps of:
   mixing a resin with an oil to form an oil-resin solution;
   adding an anhydrous boron compound or a sparingly soluble borate;
   mixing the anhydrous boron compound or a sparingly soluble borate and the oil-resin solution until the anhydrous boron compound or sparingly soluble borate is suspended within the oil-resin solution.

16. The process according to claim 15 wherein the resin comprises from about 20% to about 60% total suspension weight.

17. The process according to claim 15 wherein the oil comprises from about 20% to about 40% total suspension weight.

18. The process according to claim 15 wherein the anhydrous boron compound or sparingly soluble borate comprises up to and including 50% total suspension weight.

* * * * *